United States Patent [19]
McMurray et al.

[11] Patent Number: 4,607,330
[45] Date of Patent: Aug. 19, 1986

[54] FAULT-TOLERANT POWER SUPPLY SYSTEM

[75] Inventors: Richard D. McMurray, Santa Cruz; Alan H. Nelson, Los Gatos, both of Calif.

[73] Assignee: Parallel Computers, Inc., Santa Cruz, Calif.

[21] Appl. No.: 555,942

[22] Filed: Nov. 29, 1983

[51] Int. Cl.⁴ .............................................. G06F 1/00
[52] U.S. Cl. .................................................. 364/200
[58] Field of Search ... 364/200 MS File, 900 MS File, 364/; 371/8, 14, 66

[56] References Cited
U.S. PATENT DOCUMENTS 4,162,536  7/1979  Morley ........................... 364/200 X
4,435,764  3/1984  El-Gohary ......................... 364/200

Primary Examiner—Thomas M. Heckler
Attorney, Agent, or Firm—Limbach, Limbach & Sutton

[57] ABSTRACT

A power supply system for use in a fault-tolerant computer having a main bus interconnecting several main bus elements, with at least one of the elements being capable of transmitting commands and receiving status information. The system includes a status bus which is coupled to the main bus. A control unit is associated with each bus element, such control unit including a voltage regulator connected to a primary source of power for providing regulated voltage to the associated bus element in response to commands received over the status bus from the main bus. The primary power source preferably includes redundant power supplies which provide voltage which is distributed over a pair of redundant voltage buses. Apparatus for sensing when a main bus element has seized the main bus may be included so that the bus element can be commanded by way of the status bus to release the main bus.

17 Claims, 5 Drawing Figures

FIG._1_

FIG_2.

FAULT-TOLERANT POWER SUPPLY SYSTEM

DESCRIPTION

TECHNICAL FIELD

The present invention pertains generally to the field of power supplies, and more particularly to a fault tolerant power supply system for high reliability computers and the like.

BACKGROUND ART

High reliability electronic equipment, including fault-tolerant computer systems, have become increasingly popular due to the increased costs resulting from equipment failures. Also, fault tolerant electronic systems having redundant elements have dropped in cost because of decreasing equipment costs. By way of example, computer processor and memory costs have decreased significantly in recent years for equivalent performance.

Although the reliability of electronic systems, including computer systems, has increased, many equipment failures occur because of failures in the power supply system. Although there do exist improved reliability power supply systems having redundant elements, these systems possess many shortcomings and lack many desirable features. For example, many power supply systems now in use fail to provide sufficient redundancy so that a total power failure occurs when one of several key components fail. Although some of such subsystems utilize a battery backup in the event A.C. power is lost, the backup supplies power to only some of the components of the system such as the computer memory. Even though the memory is powered, an orderly shutdown of the computer is prevented, resulting in a loss of data.

The present power supply system overcomes the above-noted shortcoming. Redundancy of all major components is provided so that almost no single failure will result in a power loss. In the event an A.C. power loss occurs, a battery backup is provided which is capable of maintaining power for sufficient time to permit, for example, an orderly shutdown of a computer powered by the system. In addition, the subject power system includes monitoring capabilities for monitoring many vital functions of the system and command apparatus for commanding certain components of the system to predetermined states. The subject system also facilitates the diagnosis of component failures and enhances the serviceability of the equipment. These and other advantages of the subject power system will become apparent to those skilled in the art, upon reading the following Best Mode for Carrying Out the Invention, together with the drawings.

DISCLOSURE OF THE INVENTION

A power supply system for use with an electronic assembly having a main bus for interconnecting a plurality of main bus elements is disclosed. The subject system is particularly suitable for use in connection with a fault-tolerant computer. At least one of the main bus elements, such as a computer central processing unit, is capable of transmitting commands on the main bus and receiving status information.

The subject system includes a separate power control unit which is associated with each of the bus elements of the assembly. A power control unit can be provided for non-bus elements also, such as peripheral devices. Each control unit includes a voltage regulator having a power input connected to a common voltage source. The voltage regulators provide one or more regulated voltages to the associated bus element in response to commands from a main bus element such as the central processing unit of a computer.

Preferably, voltage is distributed by two redundant voltage buses. The voltage buses are connected to the output of a primary power unit which preferably is comprised of two power supplies, each having an output connected to the two voltage buses. The power supplies provide a regulated voltage to the voltage buses.

The subject system further includes a status bus which is separate from the main bus. Communications between the status and main buses are provided by a status controller. The power control units associated with the bus units also each include a command/status interface which is connected to the status bus. The interface receives commands, including control commands for the associated voltage regulator from the main bus. For example, a command could be transmitted for shutting the voltage regulator off. The interface also forwards status information regarding the associated element to the status bus. The status information is received by one of the main bus elements by way of the status controller and the main bus.

The status controller also preferably includes a locked bus sensing circuit, coupled to the main bus, which senses when one of the main bus elements has locked onto the main bus. The sensing circuit causes a reset command to be transmitted over the status bus for receipt by the particular command/status interface associated with the locked main bus element. The reset command causes the bus element to release the main bus.

BEST MODE FOR CARRYING OUT THE INVENTION

The present power supply system is intended primarily for use with computers, particularly fault tolerant computers. Although the present invention will be described in connection with a computer system, it is to be understood that many aspects of the subject power supply system would be applicable for use with other types of equipment.

Figure 1:
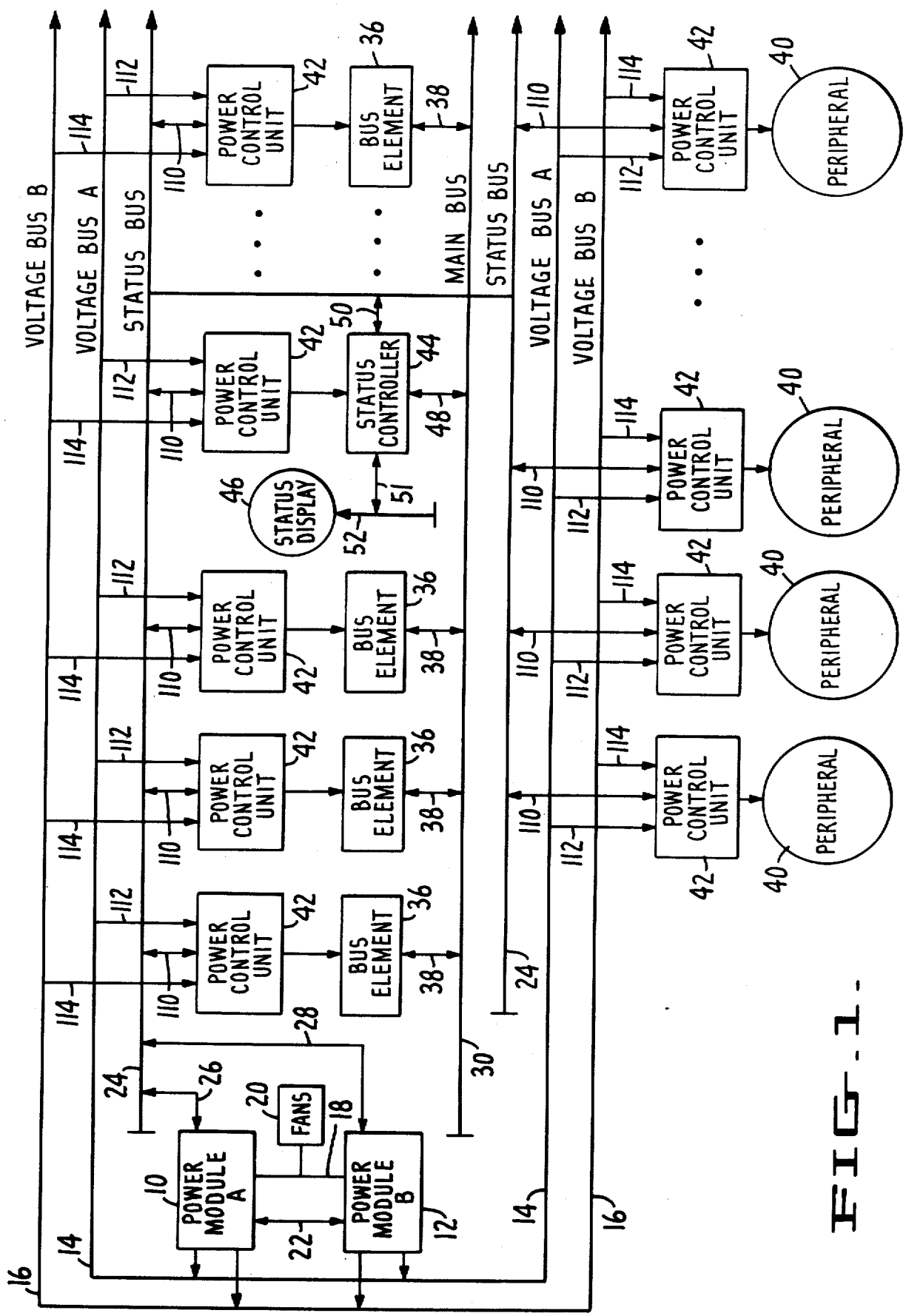
FIG. 1 is an overall block diagram of the subject power supply system.

Referring now to FIG. 1 of the drawings, the subject power system includes a Power Module A, indicated by the numeral 10, and a Power Module B, indicated by numeral 12. As will be described later in greater detail, the two power modules are connected in parallel to an A.C. power source and provide a regulated D.C. output voltage on a Voltage Bus A, indicated by numeral 14, and a Voltage Bus B, indicated by numeral 16. Power Module A and Power Module B also provide a D.C.

output voltage on a line 18. Line 18 powers a plurality of computer cooling fans, collectively represented by block 20. The two power modules also include monitoring circuitry for achieving a cross-monitoring function, as indicated by line 22, which will be subsequently described.

The power system includes a status bus 24 which provides two-way communications between the various elements connected to the bus. As indicated by lines 26 and 28, the two power modules are connected to status bus 24. The computer associated with the subject power supply system also includes a main bus 30, such as the Multi-Bus which is described in the I.E.E.E. 796 Specification. Main bus 30 provides two-way communications between the various computer elements coupled to the bus, as is well-known. The computer main bus elements, represented by blocks 36 of FIG. 1, would typically include, for example, the central processor unit, tape controller and disc controller and the like. These elements are connected to the main bus, as indicated by lines 38.

The computer system further includes various peripheral devices, represented by segments 40, which includes devices such as printers, displays, keyboards and the like. Peripheral devices 40 are powered by separate power control units 42 which perform additional functions which will be subsequently described. Power control units 42 are each coupled to the Voltage Buses A and B as indicated by lines 112 and 114, respectively, and to status bus 24 as indicated by lines 110. Each of bus elements 36 also has an associated power control unit 42 for providing power and performing other functions. The power control units 42 are each connected to the two voltage buses 14 and 16 and to status bus 24.

A status controller, represented by block 44, is further included in the subject system. Controller 44 also performs certain monitoring functions. The status controller is connected to both main bus 30 and status bus 24, as indicated by lines 48 and 50, respectively. A status display, represented by segment 46, is provided for displaying certain status information of the system. Display 46 includes an associated display bus 52 which is connected to status controller 44 as indicated by line 51 which provides two-way communication between the controller and the display. The status controller is powered by a separate power control unit 42. One of the functions provided by controller 44 is to permit master main bus 30 elements to read the status of the various elements 36 and 40 by way of the power control units 42 and the status bus. Other functions of status controller 44 will be described later.

Figure 2:
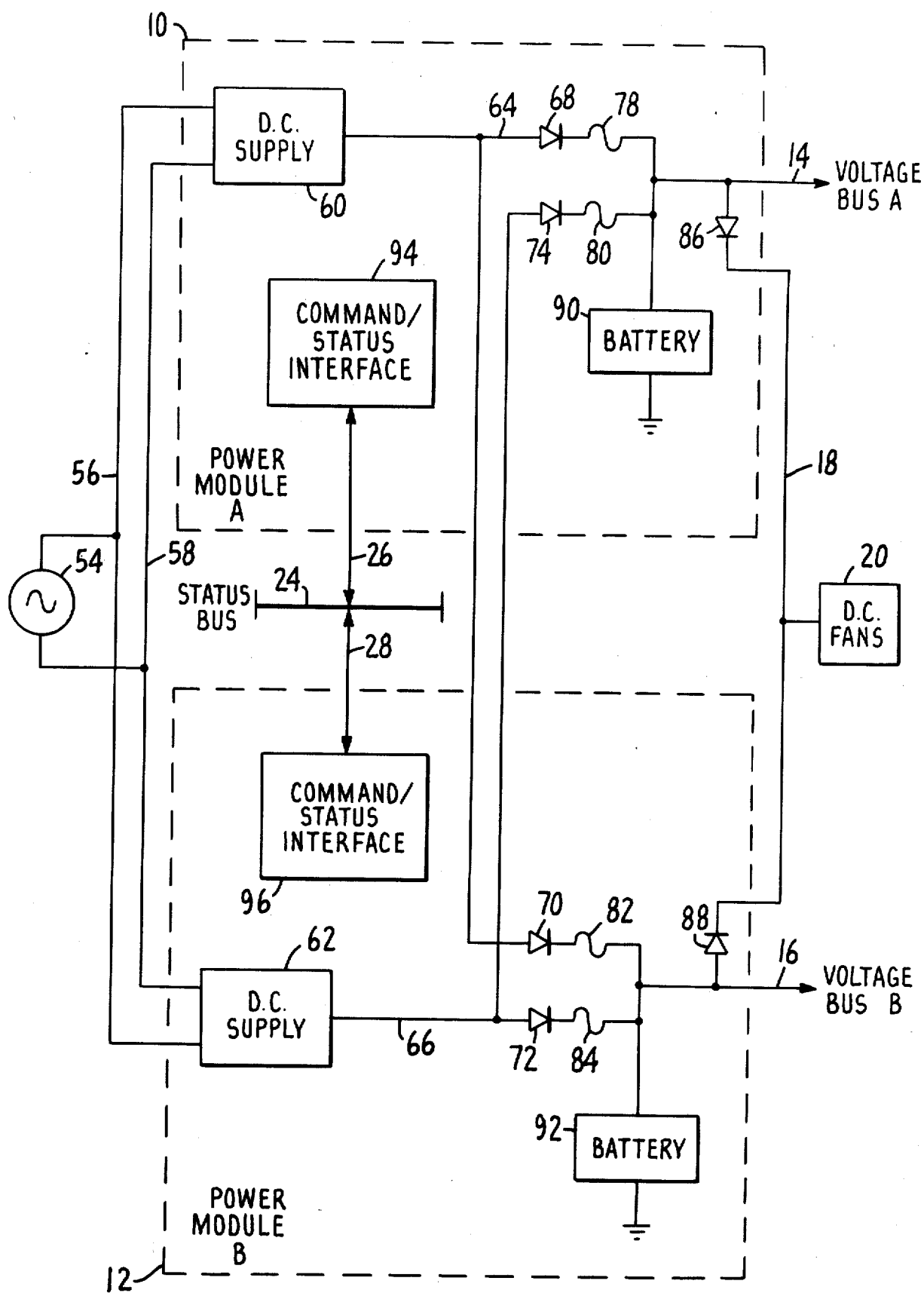
FIG. 2 is a block diagram of the two power modules of the subject power system.

Referring now to FIG. 2, power modules 10 and 12 are substantially similar in construction. The modules are connected in parallel to a common A.C. power source 54 via lines 56 and 58. Source 54 is the primary computer system power source, and is typically 110 or 220 volts A.C. Source 54 is connected to the input of a D.C. power supply 60 of module 10 and a D.C. power supply 62 of module 12. Supplies 60 and 62 provide an semi-regulated D.C. output on lines 64 and 66, respectively, of approximately +28 volts. The output of supply 60 on line 64 is connected to the anodes of a diode 68 located in module 10 and a diode 70 located in module 12. Similarly, output line 66 of supply 62 is connected to the anodes of power diode 72 in module 12 and diode 74 in module 10.

A pair of fuses 78 and 80 in module 10 are connected between the cathodes of diodes 68 and 74, respectively, and Voltage Bus A line 14. Similarly, a pair of fuses 82 and 84 in module 12 are connected between the cathodes of diodes 70 and 72, respectively, and Voltage Bus B line 16. Module 10 further includes a diode 86 having its anode connected to Voltage Bus A line 14 and its cathode connected to the power input of cooling fans 20 by way of line 18. Module 12 also includes a diode 88 having its anode connected to Voltage Bus B line 16, and its cathode connected to line 18 of the power input to fans 20. Each of modules 10 and 12 also includes a battery pack 90 and 92, respectively, connected between voltage bus lines 14 and 16, respectively, and ground. Finally, modules 10 and 12 each include command/status interface circuitry 94 and 96, respectively, which are connected to status bus 24 via lines 26 and 28, respectively.

In general operation, supplies 60 and 62 provide regulated power to both voltage buses A and B. In addition, regulated D.C. is provided by each voltage bus to the cooling fans 20. The two supplies 60 and 62 continually charge both battery packs 90 and 92, with the battery packs providing filtering for the outputs of the supplies. In the event one of the supplies 60 or 62 fails, the remaining supply has sufficient capacity to power the entire computer system. Diodes 68 and 70 prevent a failure of supply 60 from pulling down either voltage bus. Similarly, diodes 72 and 74 prevent a failure of supply 62 from disrupting the voltage on either bus. Either of supplies 60 or 62 has sufficient current output capability to open fuses 78, 80, 82 and 84 should the associated voltage bus draw an excess amount of current. Thus, a failed voltage bus will be isolated from the remainder of the power supply system.

Batteries 90 and 92 will provide power for the two voltage buses should both D.C. supplies 60 and 62 fail. Each battery has sufficient capacity to power the computer system, including the cooling fans 20, until an orderly computer shutdown has taken place. Thus, even if one of the batteries is defective, no loss of computer data occurs. Also, the computer system will remain operative even if one of the two voltage buses 12 or 14 completely fails. Diodes 86 and 88 prevent a failure of one bus from disrupting the remaining bus as a result of the common connection of the buses to the cooling fans. As will be seen, the remaining common connections of the two voltage buses are protected by similar isolation diodes.

The command/status interface circuits 94 and 96 of the power modules, in conjunction with the status controller 44 (FIG. 1), permit the exchange of status and command information via status bus 24. Each of the power control units 42 (FIG. 1) includes a similar interface circuit for receiving and transmitting commands.

Figure 4:
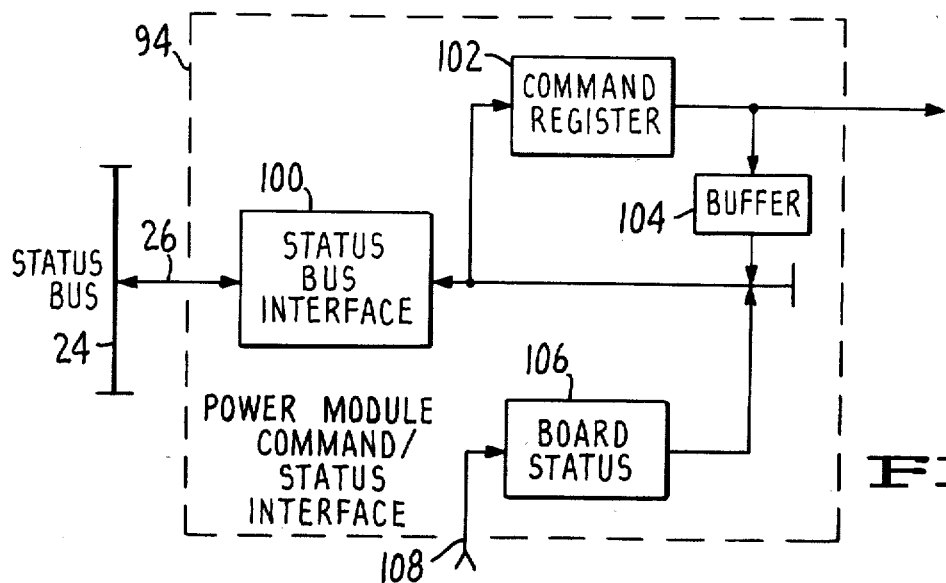
FIG. 4 is a block diagram of one of the power module command status interface circuits of the system.

FIG. 4 shows details of command/status interface circuit 94 of the Power Module A which is identical to interface circuit 96 of the Power Module B. Circuits 94 and 96 are also similar to the power control unit 42 interface circuits to be subsequently described. Interface circuit 94 includes a status bus interface circuit 100 which is coupled to status bus 24 as indicated by line 26. Circuit 100 detects commands, primarily from the computer central processor, on the status bus which are intended for Power Module A and decodes the commands. Interface 100 also transmits status information from the Power Module A to other elements of the system, primarily the computer central processor, via the status bus. Commands transmitted to the power module are transferred from interface 100 to a command register 102. The contents of register 102 are fed to a buffer 104, the output of which is coupled back to interface 100. After a command is received, buffer 104 causes the command to be transmitted back to the source thereby acknowledging receipt of the command. Buffer 104 also retains the last command transmitted for the purpose of responding to command status inquiries. The commands from register 102 are also forwarded to appropriate circuitry (not shown) for response thereto. Table 1 sets forth exemplary command words which may be transmitted to the command/status interfaces 94 and 96 of the power modules.

TABLE 1

OFF
CHANGE

Receipt of the word OFF will cause the module to shut itself off. Finally, receipt of command word CHANGE will cause an indicator light associated with the module to be activated, thereby directing the user to remove the module. Other command words can be used, as desired.

Status interface 94 also monitors the status of Power Module A and other elements of the system for transmission back to other elements on the main bus, primarily the computer central processor. This function is represented by block 106. Line 108 forwards status information to block 106 which is provided by various elements associated with the power module. Table 2 sets forth exemplary status words which can be transmitted by interface 94.

TABLE 2

BATTERY
POWER FAIL
A MODULE
B MODULE
FAN 1
FAN 2
FAN 3
FAN 4
OVERHEAT

Status word BATTERY indicates that the battery pack 90 of the module needs changing. Status word POWER FAIL indicates that the A.C. power supplied to the module has failed. Transmission of word A MODULE signifies that the Power A Module has failed and transmission of word B MODULE indicates that the B module has failed. Words FAN 1, FAN 2, FAN 3 or FAN 4 will be produced in the event one or more of the four cooling fans has failed. Finally, transmission of word OVERHEAT indicates that the temperature of the system has exceeded a predetermined level. Other status words can also be used, as desired.

Figure 5:
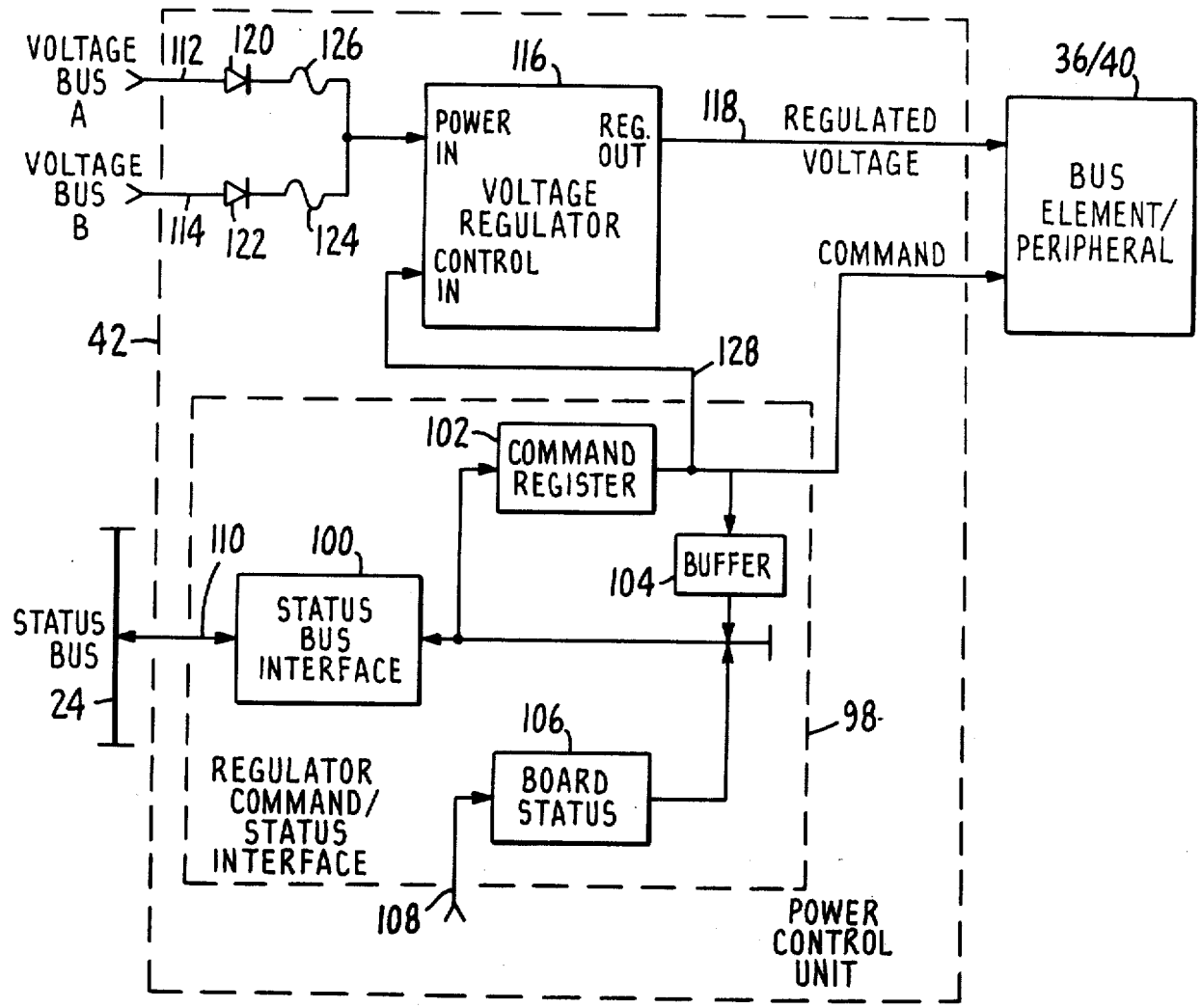
FIG. 5 is a block diagram of one of the power control units which is associated with the main bus elements and peripheral elements.

Each of the power control units 42, as previously noted, also includes a command/status interface circuit 98, as shown in FIG. 5. Interface circuits 98 include the same primary components as do the power module interface circuits 94, including a status bus interface 100, a command register 102, a buffer 104 and board status circuitry.

The power control units 42 also each include a voltage regulator 116 which provides regulated D.C. output voltages to the associated bus element 36 or peripheral device 40 as represented by line 118. The output voltages typically include +12 volts, +5 volts and -12 volts, although other voltages can be provided as required. Regulator 16 is preferably a switching-type regulator which has greater efficiency than, for example, a series-pass regulator. The power input of switching regulator 116 is connected to the cathodes of a pair of power diodes 120 and 122 through fuses 124 and 126, respectively. The anodes of diodes 120 and 122 are connected to the two voltage buses 112 and 114, respectively. Diodes 120 and 122 provide isolation in the event either of the voltage buses 112 or 114 fails. Power modules 10 and 12 also have sufficient current output capacity to open fuses 124 and 126 and thereby isolating the voltage regulator 116 from the rest of the system should the regulator draw an excess amount of current. Switching regulator 116 is further provided with a control input which is connected to the output of command register 102 of the associated command/status interface 98, as represented by line 128. Control signals on line 128 are capable of controlling regulator 116 in various ways, including shutting the regulator off, and varying the output voltages on line 118.

The command/status interface circuit 98 associated with each of the power control units is capable of receiving various commands transmitted on status bus 24, primarily from the central processing unit of the computer. Table 3 sets forth exemplary command words which may be transmitted to interface circuit 98.

TABLE 3

RESET
OFF
CHANGE
INCREASE
DECREASE

The first three command words, RESET, OFF and CHANGE, are similar to those received by the command/status interface circuits 94 associated with the power modules as previously described. When the command word RESET is received, the related bus element 76 or peripheral device 40 is reset to a predetermined state. For example, a RESET word may be transmitted for the purpose of causing a main bus element 36 to release the main bus 30, as will subsequently be described. Receipt of word OFF will cause the associated switching regulator 116 to shut off. Receipt of command word CHANGE will cause an indicator light associated with the bus element or peripheral to be activated thereby directing the user to replace the element or device. Command words INCREASE or DECREASE will cause the output voltage of regulator 116 to increase or decrease, respectively, a predetermined amount. Typically, only the +5 volt output is changed. The voltage may, for example, either increase to +5.25 volts or decrease to 4.75 volts. This feature is useful in testing the bus element or peripheral device powered by the regulator and uncovering marginal operating conditions.

The regulator command/status interface 98 is also capable of transmitting status information over status bus 24. The status information is received on line 108 which is coupled to board status circuitry represented by block 106. A status word ALIVE will be transmitted in the event the associated switching regulator 116 is turned on. Other status words could be used as desired.

As previously noted, status controller 44 (FIG. 1) enables the computer central processor, or other element on main bus 30, to read status information from bus elements 36, peripheral devices 40 and power modules 10 and 12 and to transmit commands to these units via status bus 24. These functions are accomplished together with the associated command/status interface circuits 94 and 98. The status controller 44 also provides a means by which the computer central processor or other element on main bus 30 may display status information on display 46. In addition, status controller 44 provides a means for the detection of a bus master which is locked on main bus 30 for more than a predetermined time period and for commanding the bus master to be reset so as to release the main bus.

Figure 3:
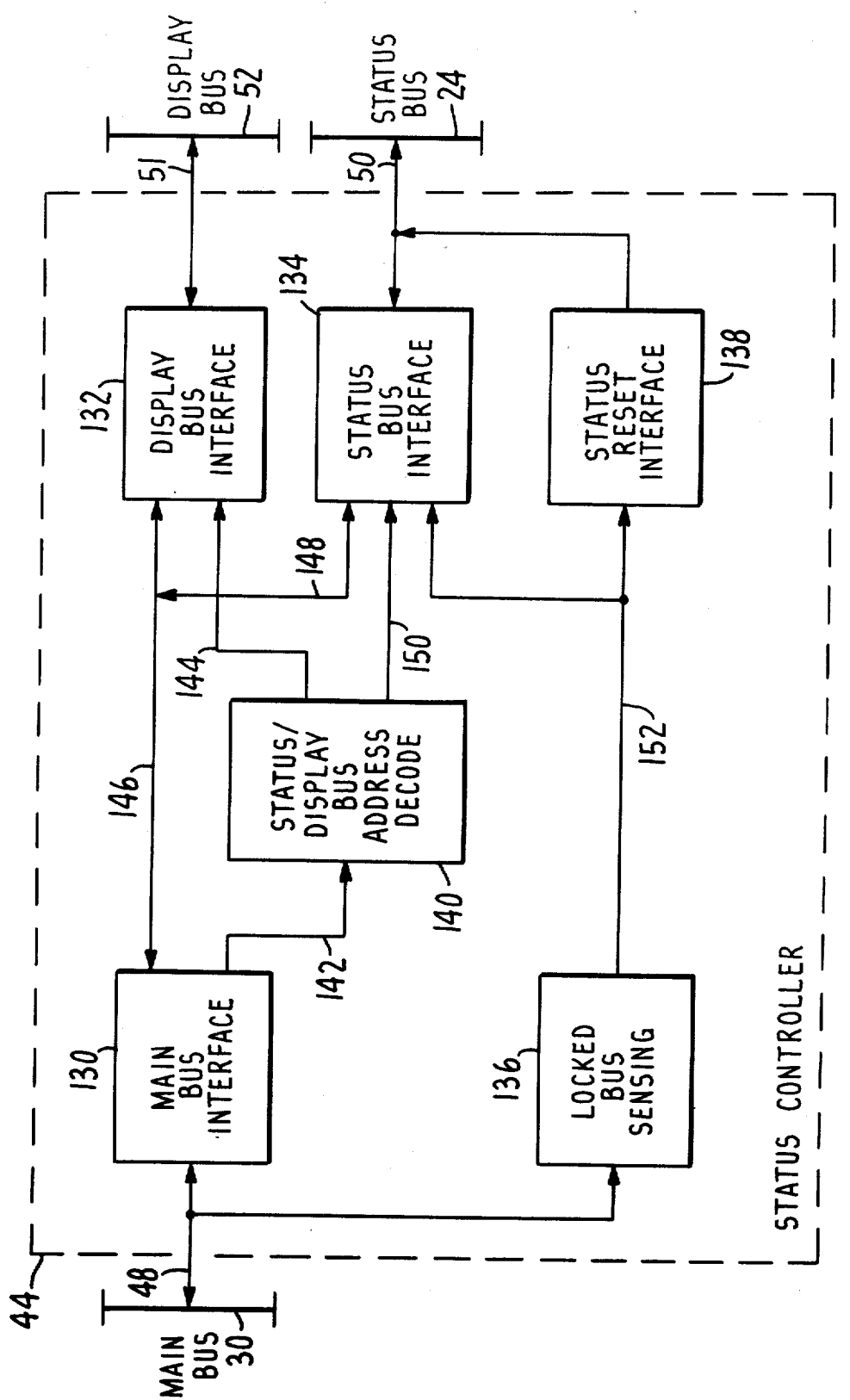
FIG. 3 is a block diagram of the status controller of the subject system.

Referring now to FIG. 3, further details of the operation of status controller 44 will now be given. Controller 44 includes main bus interface circuitry represented by block 130, which receives and transmits information to and from main bus 30. Status controller 44 further includes display bus interface circuitry 132 and status bus interface circuitry 134 which are connected to the display and status buses as indicated by lines 51 and 50, respectively. Locked bus sensing circuitry, represented by block 136, is also connected to main bus 30. Circuitry 136 provides an output which is coupled to status bus interface circuit 134 and to a status reset interface circuit 138. Controller 44 further includes status/display bus address decode circuitry which is represented by block 140, and which has outputs connected to the display and status bus interfaces 132 and 134, respectively.

The sequence for displaying status information on status display 46 will now be given. The central processor unit or other element on main bus 30 issues a command which includes the address of the display bus 52 and the data to be displayed. The command is received by main bus interface 130 which forwards the address portion of the command to address decode circuit 140 as indicated by line 142. Decode circuit 140 detects that the address is a display bus address and enables display bus interface 132 via line 144. The data portion of the display command is forwarded directly to the display bus interface 132 on line 146. Display bus interface 132 then forwards the data to be displayed together with the corresponding address to status display 46 (FIG. 1) by way of display bus 52.

The central processor unit can also request that status controller 44 provide status information regarding display 46. In that event, display status data are transmitted from the display bus back to main bus interface 130 via display bus interface 132. The status data are then forwarded to the processor by way of main bus 30.

Status words, such as those of Table 2 produced by the power modules, are transmitted over status bus 24 and received by status bus interface 134. The status data are then transferred to main bus interface 130 by way of lines 148 and 146. The status data are then transferred to main bus 30 for transmission to the central processor unit or other main bus 30 element.

The central processor or other main bus 30 element can command bus elements 38 or peripheral devices 40 utilizing the status bus as previously noted. A command is issued on main bus 30 which is received by main bus interface 130. The address portion of the command is forwarded to status/display bus address decoder 140. Decoder 140 determines that the command is for the status bus and enables the status bus interface via line 150. The command data, which represents a command word such as one of the words set forth in Table 3, is then transferred to status bus 24 via lines 146, 148 and interface circuit 134. The address of the bus element 38 or peripheral device 40 for which the command is intended is also transferred to the status bus. The command/status interface circuit 94, 98 of the addressed power control unit 42 will receive the command and forward it to the associated bus element 36 or peripheral device 40 so that it may be acted upon. If the command is directed to a power module, the module itself will act on the command.

Locked bus sensing circuit 136 includes internal timing circuitry (not shown) for detecting when a bus master element on main bus 30 has been locked onto the bus for more than a predetermined amount of time. When this anomaly is detected, sensing circuit 136 disables status bus interface circuit 134 via line 152. In addition, a reset command is produced by sensing circuit 136 which is transferred to status reset interface 138. The command, which is the command word RESET of Table 3, includes an address which corresponds to the master bus element which is locked onto the main bus. The command is coupled to the command/status interface circuit 98 (FIG. 5), by way of status bus 30, of the power control unit which is associated with the bus element locked onto the main bus. The command is processed by interface circuit 98 in the manner previously described and the bus element is reset thereby causing the element to release the bus.

Thus, a novel power supply system for use with a fault-tolerant computer and the like has been disclosed. The system is highly reliable because of the novel arrangement of the various redundant elements. In addition, the status bus permits communication between components which are not connected to the main bus and provides an alternative communication path. Thus, if the main bus is inoperative because, for example, the bus has been seized by a master main bus element, a means is provided for commanding the element to release the bus. In addition, the distributed voltage regulators permit power to an individual element to be turned off or varied without affecting the other elements. Thus, power to an individual computer card can be switched off, thereby permitting the card to be safely removed while the remaining cards are powered. In addition, the voltage to individual cards can be independently varied while the system is operating, thereby greatly simplifying troubleshooting of card failures. While a preferred embodiment of the power system has been disclosed in some detail, it is to be understood that many changes to the system by persons skilled in the art can be made without departing from the spirit and scope of the invention as defined in the appended claims.

What is claimed is:

1. A power supply system for providing power to an electronic assembly, wherein the assembly includes a plurality of bus elements which are interconnected by a main bus which provides two-way communications between the bus elements and at least one non-bus element which is not interconnected with the main bus, and where at least one of the bus elements is capable of transmitting commands onto and receiving status information from the main bus, said power supply system comprising:

primary power means for providing a source of electrical power;
voltage bus means coupled to said primary power means for distributing electrical power;

status bus means for providing a two-way communications path independent of the main bus of the electronic assembly;

a status controller which includes status bus interface means for providing a communications path between the main bus and said status bus means;

a separate power control unit associated with at least two of the main bus elements and at least one of the non-bus elements, each of said power control units including (i) command/status interface means coupled to said status bus means for receiving commands on said status bus means and for transmitting status information onto said status bus means, and (ii) voltage regulator means coupled to said voltage bus means for providing regulated voltage to the associated element in response to commands received from said command/status interface;

whereby a main bus element may control regulated voltage to one of said associated main bus and non-bus elements by transmitting a command over the main bus and onto said status bus by way of said status controller for receipt by said command/status interface means for receipt by said voltage regulator means, and a main bus element may receive status information on said main bus from said command/status interface means by way of said status bus means and said status controller.

2. The power supply system of claim 1 further including a display means for displaying information, display bus means for transmitting information from said status controller to said display means and said status controller further including display bus interface means for transferring status information from the main bus to the said display bus means for display by said display means.

3. The power supply system of claim 1 wherein said status controller further includes locked bus sensing means coupled to the main bus for transmitting a release command on said status bus when a main bus element has retained the main bus for more than a predetermined time period and wherein said power control units further include main bus release means coupled to said status bus means for causing the associated main bus element to release the main bus in response to receipt of said release command.

4. The power supply system of claim 1 wherein said voltage regulator means varies the magnitude of said regulated voltage in response to said commands.

5. The power supply system of claim 1 wherein said primary power means includes at least two separate power supplies for connection to a common A.C. power source.

6. The power supply system of claim 5 wherein said voltage bus means includes at least two separate voltage buses, with each of said voltage buses coupled to each of said separate power supplies.

7. The power supply of claim 6 wherein said voltage regulator means of said power control units are coupled to each of said separate voltage buses.

8. The power supply system of claim 7 further including power supply isolation means for isolating one of said power supplies from said voltage buses should the output voltage of said one power supply drop below a predetermined level.

9. The power supply system of claim 8 wherein said power supply isolation means includes a diode connected between outputs of each of said power supplies and each of said voltage buses.

10. The power supply system of claim 8 further including first voltage bus isolation means for isolating one of said voltage buses from said voltage regulator means should the voltage on said one voltage bus drop below a predetermined level.

11. The power supply system of claim 10 wherein said first voltage bus isolation means includes a diode connected between each of said voltage buses and said voltage regulator means.

12. The power supply system of claim 8 further comprising second voltage bus isolation means for isolating one of said voltage buses from said power supplies should the current flow on said one voltage bus exceed a predetermined level.

13. The power supply system of claim 12 wherein said second voltage bus isolation means includes a fuse connected between each of said voltage buses and each of said power supplies.

14. The power supply system of claim 8 further comprising voltage regulator isolation means for isolating one of said voltage regulator means from said voltage buses should the current flow to said one voltage regulator means exceed a predetermined level.

15. The power supply system of claim 14 wherein said voltage regulator isolation means includes a fuse connected between each of said voltage buses and each of said voltage regulator means.

16. The power supply system of claim 8 further comprising a battery coupled to the output of each of said power supplies.

17. A power supply system for providing power to an electronic assembly wherein the assembly includes a plurality of main bus elements which are interconnected by a main bus which provides two-way communication between the main bus elements and at least one of said main bus elements is capable of transmitting commands onto and receiving status information from the main bus, said power supply system comprising:

primary power means for providing a source of electrical power including at least two power supplies connected to a common power source;

voltage bus means coupled to said primary power means for distributing electrical power including at least two separate voltage buses;

status bus means for providing a two-way communications path;

a status controller which includes status bus interface means for providing a communications path between said main bus and said status bus means, and locked bus sensing means for transmitting a release command on said status bus means when a main bus element has retained the main bus for more than a predetermined time period;

a separate power control unit associated with at least two of the main bus elements, with each of said power control units including (i) command/status interface means coupled to said status bus means for receiving commands on said status bus means and for transmitting status information onto said status bus means;

(ii) voltage regulator means coupled to said at least two voltage buses for providing regulated voltage to the associated main bus element in response to commands received from said command/status interface;

(iii) status means for providing status information regarding the associated main bus element to said command status interface means, and;

(iv) main bus release means for causing the associated main bus element to release the main bus in response to receipt of one of said release command by said command/status interface means of said association main bus element.

* * * * *